United States Patent
Roehmer et al.

(10) Patent No.: US 6,923,351 B2
(45) Date of Patent: Aug. 2, 2005

(54) TIRE CARRIER ASSEMBLY

(75) Inventors: Marcus Roehmer, Scottsdale, AZ (US); Michael Kenney, Maricopa, AZ (US)

(73) Assignee: SMA-Patents, L.L.C., Phoenix, AZ (US)

(*) Notice: Subject to any disclaimer, the term of this patent is extended or adjusted under 35 U.S.C. 154(b) by 17 days.

(21) Appl. No.: 10/279,647

(22) Filed: Oct. 24, 2002

(65) Prior Publication Data

US 2004/0079774 A1 Apr. 29, 2004

(51) Int. Cl.[7] ............................................. B62D 43/00
(52) U.S. Cl. ............................ 224/42.21; 224/42.24; 224/509; 224/517
(58) Field of Search .......................... 224/502, 505, 224/506, 509, 512, 517, 518, 42.21, 42.24, 42.28; 414/463, 466

(56) References Cited

U.S. PATENT DOCUMENTS

| | | | |
|---|---|---|---|
| 1,519,894 A | * 12/1924 | Henry | ............ 224/42.21 |
| 2,674,393 A | * 4/1954 | Clark | ............ 414/465 |
| 4,679,717 A | 7/1987 | Hansen | |
| 4,817,834 A | 4/1989 | Weiler | |
| 5,104,015 A | * 4/1992 | Johnson | ............ 224/401 |
| 5,358,157 A | * 10/1994 | Abretske | ............ 224/509 |
| 5,538,168 A | 7/1996 | Burger et al. | |
| 5,806,736 A | 9/1998 | Kincart | |

\* cited by examiner

*Primary Examiner*—Stephen K. Cronin
(74) *Attorney, Agent, or Firm*—Mark P. Wright; Wright Law Group PLLC

(57) ABSTRACT

The tire carrier assembly of the present invention is mounted to the frame of a vehicle by removing the existing D-rings and placing the mounting brackets for the tire carrier over the apertures where the existing D-rings were mounted. The existing D-rings are then placed over the tire carrier mounting brackets and the entire assembly is mounted or coupled to the vehicle, using the original mounting apertures for the D-rings.

18 Claims, 3 Drawing Sheets

TIRE CARRIER ASSEMBLY

BACKGROUND OF THE INVENTION

1. Technical Field

The present invention relates generally to vehicles and more particularly to an assembly adapted to fasten a spare tire to an off-road vehicle or sport utility vehicle (SUV).

2. Background Art

Spare tires are almost always provided as standard equipment with most vehicles. In most passenger vehicles, the spare tire is located in the trunk or cargo compartment. Since most of these vehicles are utilized mainly for the movement of passengers, the trunk space is often under-utilized and the positioning of a spare tire in the trunk rarely occupies needed space. However, the situation with respect to light trucks, sport-utility and recreational vehicles, is much different. Due to the nature of these vehicles, interior storage space is often highly valued and an interior positioned spare tire would result in the undesirable reduction of precious cargo space. As a result, externally mounted spare tire carriers are often useful options for such vehicles.

One type of external tire carrier enables a spare tire to be mounted below or underneath the vehicle. However, this approach has proven relatively problematic for a number of reasons. Specifically, a tire mounted below the vehicle tends to reduce the vehicle's practical road clearance. This reduction in clearance may prevent the vehicle from entering into rough areas that require that the vehicle maintain a certain ground clearance. This is especially problematic for off-road vehicles where the primary function is carrying passengers and cargo to remote or relatively inaccessible areas over unpaved access roads. Also, a tire carrier mounted beneath the vehicle may occupy space otherwise available for a secondary fuel tank.

A second and more popular type of spare tire carrier is secured to the rear of vehicles, either by attachment to the rear body panel of the vehicle or, in the alternative, by attachment to the bumper and secured to the vehicle through a body mounted latch. However, these tire carriers may also present certain concerns. For example, those tire carriers supported exclusively by the body panel of the vehicle tend to vibrate significantly whenever the vehicle is in motion. In some circumstances, the combined forces exerted on the body panel as a result of the carrier weight and vibration may cause damage to the body panel. The tire carriers supported primarily through connection with the bumper and a body mounted latch, while less vibratory while the vehicle is in motion, tend to place a significant amount of stress on the body mounted latch as a result of the inherent instability of the bumper attachment of the carrier. Further, mounting the tire carrier on the bumper typically requires significant and irreversible modification of the bumper.

Another consideration with many conventional externally mounted spare tire carriers is that they are not well suited for vehicles with a rear door that opens upwardly or outwardly. With these types of vehicles, attaching the spare tire carrier to the rear door or in front of the rear door of the vehicle would effectively prevent the lift door from opening and, therefore, would reduce or prohibit access to the rear of the vehicle. Additionally, many conventional rear-mounted spare tire carriers are located so as to practically obscure the license plate of the vehicle in an undesirable fashion. Finally, while some spare tires are configured to be mounted on top of the cab of the vehicle, this solution may also present certain difficulties. For example, some people may have difficulty maneuvering the spare tire onto and off of the roof without help or without inadvertently damaging the roof.

Accordingly, without an improved externally mounted tire carrier assembly that provides for secure mounting and easy access to the spare tire, carrying a spare tire and/or replacing a flat tire on an SUV will continue to be sub-optimal.

BRIEF SUMMARY OF THE INVENTION

The tire carrier assembly of the present invention is mounted to a vehicle by removing the existing D-rings and placing the mounting brackets for the tire carrier over the vehicle mounting apertures where the existing D-rings were mounted. The existing D-rings are then placed over the tire carrier mounting brackets and the entire assembly is fastened to the vehicle, using the vehicle mounting apertures and mounting bolts originally supplied by the vehicle manufacturer for installing the D-rings.

BRIEF DESCRIPTION OF DRAWINGS

The preferred embodiments of the present invention will hereinafter be described in conjunction with the appended drawings, wherein like designations denote like elements, and.

DETAILED DESCRIPTION OF THE PREFERRED EMBODIMENTS

Many SUVs and off-road vehicles are presently equipped with manufacturer installed "D-rings" or tow rings that are mounted on the exterior of the vehicle. These D-rings are typically supplied so that the vehicle may be quickly coupled to an external load such as a trailer, boat, another vehicle and the like. Accordingly, the SUV or off-road vehicle may be quickly configured to tow the external load. In most cases, these D-rings are directly or indirectly coupled to the frame of the vehicle, providing stability and strength for the D-rings. The D-rings may be coupled to the frame of the vehicle using various techniques such welding or threaded bolt assembly. The present invention is especially well suited for adaptation and use with vehicles that employ a threaded bolt assembly to securely couple the D-rings to the frame of the vehicle.

Figure 1:
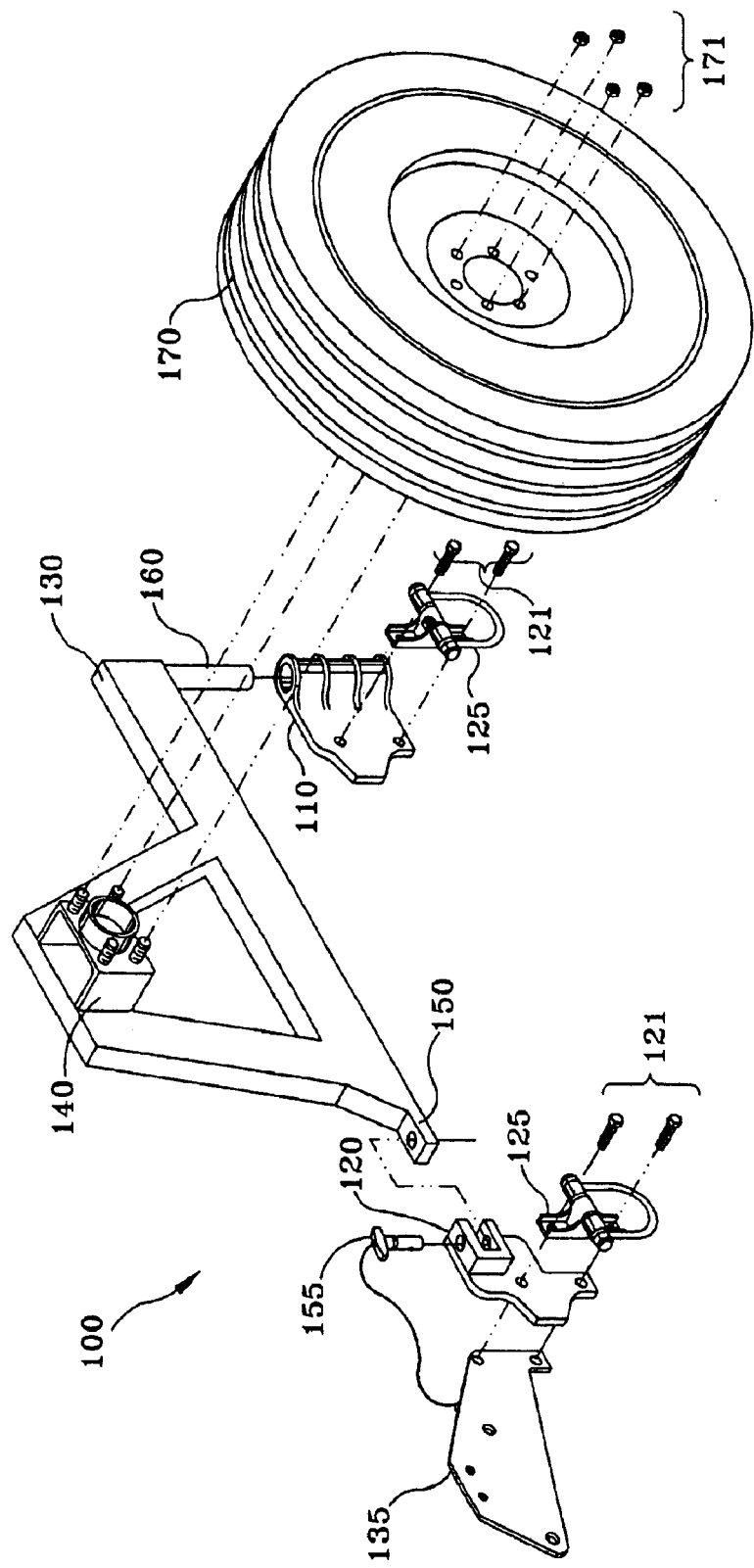
FIG. 1 is a perspective view of a tire carrier assembly in accordance with a preferred embodiment of the present invention.

Referring now to FIG. 1, a tire carrier assembly 100 in accordance with a preferred exemplary embodiment of the present invention includes a hinge bracket 110, a latch bracket 120, a swing arm assembly 130; and an optional license plate bracket 135. Swing arm assembly 130 comprises a tire mounting portion 140, a coupling portion 150, and a pin portion 160. In the most preferred embodiments of the present invention, license plate bracket 135 further comprises a T-pin 155 for securing swing arm assembly 130 in place within latch bracket 120.

As shown in FIG. 1, hinge bracket 110 and latch bracket 120 are configured to be mounted to a vehicle (not shown this FIG.) by utilizing a plurality of mounting bolts 121. D-rings 125 are most preferably manufacture supplied towing rings. Hinge bracket 110 and latch bracket 120 are positioned between D-rings 125 and the body of the vehicle. By inserting mounting bolts 121 through apertures in the brackets for D-rings 125 and then through apertures formed in hinge bracket 110 and latch bracket 120, hinge bracket 110 and latch bracket 120 may be secured to the frame of the vehicle, beneath D-rings 125. In this fashion, drilling extra apertures in body of the vehicle can be avoided.

Swing arm assembly 130 is configured to be mounted to hinge bracket 110 by inserting pin portion 160 into hinge bracket 110. Swing arm assembly 130 is also configured to be selectively coupled to latch bracket 120. Latch bracket 120 is configured to receive coupling portion 150 of swing arm assembly 130 and may be securely held in place by inserting T-pin 155 through apertures in latch bracket 120 after pin portion 150 has been moved within the body of latch bracket 120. After tire carrier assembly has been coupled to a vehicle in this fashion, a tire 170 may be mounted on tire mounting portion 140 of swing arm assembly 130 by utilizing a plurality of nuts 171.

While the various components of tire carrier assembly 100 may be manufactured from a variety of materials, in the most preferred embodiments of the present invention, hinge bracket 110, latch bracket 120, and swing arm assembly 130 are each manufactured from a hardened steel and covered with a powder-coated finish to protect the various components of tire carrier assembly 100. Additionally, the most preferred embodiments of the present invention incorporate machined-out portions on the various components such as hinge bracket 110 and latch bracket 120 that are especially useful for reducing the weight of hinge bracket 110 and latch bracket 120.

While D-rings 125, hinge bracket 110, and latch bracket 120 are shown in FIG. 1 as discrete components, certain preferred embodiments of the present invention may include a latch bracket 110 with an integrated D-ring 125. Similarly, in certain preferred embodiments of the present invention, hinge bracket 110 may also include an integrated D-ring 125. In at least one preferred embodiment of the present invention, tire carrier assembly 100 is provided as an aftermarket accessory for off-road vehicles and sport utility vehicles. In yet another preferred embodiment of the present invention, tire carrier assembly 100 is a manufacturer or dealer installed option.

In addition to providing an improved tire carrier assembly, the methods of the present invention provide an improved method for mounting tire carrier assembly 100 to the exterior of a vehicle such as an SUV. Specifically, by utilizing the existing manufacturer-provided mounting apertures for the manufacturer-supplied D-rings to mount tire carrier assembly 100, tire carrier assembly 100 can be quickly and securely coupled to the frame of the vehicle. This also allows tire carrier assembly 100 to be installed without any undesirable or permanent modification of the body or frame of the vehicle. Accordingly, the various preferred embodiments of tire carrier assembly 100 can be easily removed and the vehicle can be restored to its original condition by simply removing mounting bolts 121 and removing the components of tire carrier assembly 100 and then reinstalling mounting bolts 121.

To install tire carrier assembly 100 to a vehicle, mounting bolts 121, most preferably provided by the manufacturer to couple D-rings 125 to the frame of the vehicle, are removed. Then, hinge bracket 110 and latch bracket 120 are positioned over the existing manufacturer provided mounting apertures for D-rings 125. Next, the D-rings 125 are positioned over hinge bracket 110 and latch bracket 120, taking care to align the mounting apertures in the D-rings 125 with the mounting apertures in hinge bracket 110 and latch bracket 120. In turn, the mounting apertures in hinge bracket 110 and latch bracket 120 are aligned with the existing manufacturer provided mounting apertures for D-rings 125. If desired, license plate bracket 135 is also positioned between latch bracket 120 and the body of the vehicle, aligning the mounting apertures in license plate bracket 135 with the mounting apertures in latch bracket 120. Obviously, if a given vehicle does not have manufacture installed D-rings 125 and the corresponding mounting apertures, they may be installed as part of the overall process of installing tire carrier assembly 100.

After aligning all of the mounting apertures, mounting bolts 121 can be inserted through the mounting apertures and tightened in place, thereby simultaneously securing license plate bracket 135, hinge bracket 110, latch bracket 120, and D-rings 125 to the frame of the vehicle. After securing hinge bracket 110 and latch bracket 120 in place, swing arm assembly 130 can be coupled to hinge bracket 110 by inserting pin portion 160 into hinge bracket 120 and securing coupling portion 150 with latch bracket 120 as described in conjunction with FIGS. 2–4.

Figure 2:
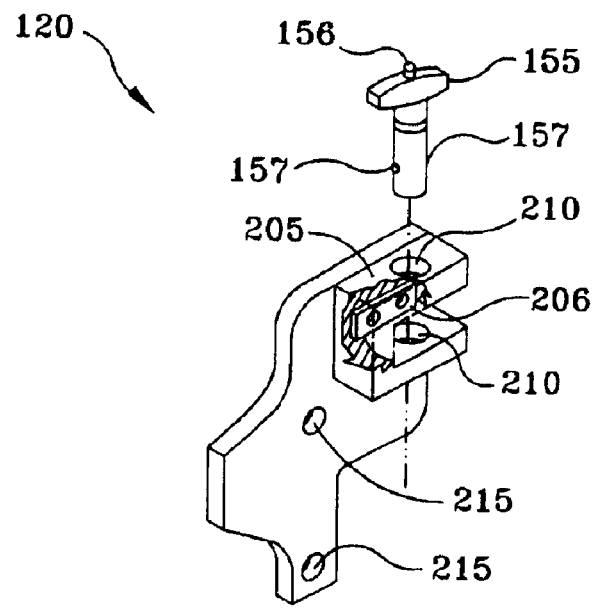
FIG. 2 is a perspective view of a latch bracket for a tire carrier assembly in accordance with a preferred embodiment of the present invention.

Referring now to FIG. 2, a latch bracket 120 in accordance with a preferred exemplary embodiment of the present invention comprises a pin-receiving body 205, a pair of receiving apertures 210, and a pair of mounting apertures 215. As previously explained, mounting bolts 121 are used to secure latch bracket 120 to a vehicle. Pin-receiving body 205 is configured to receive pin portion 150 of swing arm assembly 130 (not shown this FIG.). After receiving pin portion 150 of swing arm assembly 130, T-pin 155 is removably inserted through apertures 210, thereby securing swing arm assembly 130 to latch bracket 120 and, by extension, to the vehicle frame. Mounting apertures 215 are each configured to receive a mounting bolt 121 (not shown this FIG.).

In certain preferred embodiments of the present invention, pin-receiving body 205 further comprises a cushion 206 that is positioned and configured to prevent pin portion 150 of swing arm assembly 130 from directly striking pin-receiving body 205. Cushion 206 is most preferably manufactured from a durable resilient material such as plastic. In the most preferred embodiments of the present invention, latch bracket 120 is configured to accept a padlock or other locking mechanism, thereby securing swing arm assembly 130 in place and preventing any undesired access to the interior of the vehicle through the rear door of the vehicle.

Figure 3:
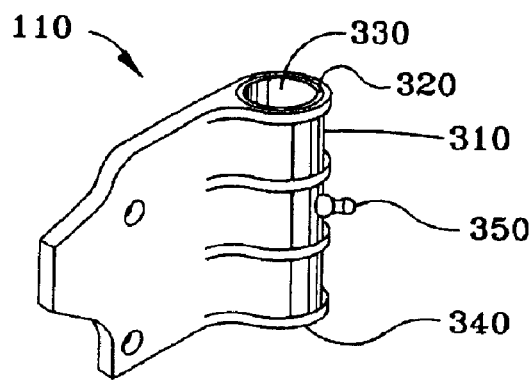
FIG. 3 is a perspective view of a hinge bracket for a tire carrier assembly in accordance with a preferred embodiment of the present invention.

Referring now to FIG. 3, a hinge bracket 110 in accordance with a preferred exemplary embodiment of the present invention includes a sleeve portion 310 that is configured to receive pin portion 160 of swing arm assembly 130. The most preferred embodiments of the present invention also comprises a rubber insert 320 and a bronze insert 330. Additionally, hinge bracket 110 is most preferably configured with a freeze plug 340 and a grease plug 350. Bronze insert 330 is most preferably a machine bushing manufactured from a 660 bronze alloy and is provided to enhance the rotational movement of pin portion 160 within sleeve portion 310 as swing arm assembly 130 is rotated into position.

Freeze plug 340 is most preferably a selectively removable thin-walled disc that can be removed, if necessary, to allow access to the bottom of sleeve portion 310. This may be desirable in situation where swing arm assembly 130 is "stuck" in place. Grease plug 350 is configured to receive a lubricating material such as grease to enhance the rotational movement of pin portion 160 within sleeve portion 310 as swing arm assembly 130 is rotated into position. In the most preferred embodiments of the present invention, grease plug 350 is a standard "zerk-type" grease fitting, typically found in automotive applications.

Figure 4:
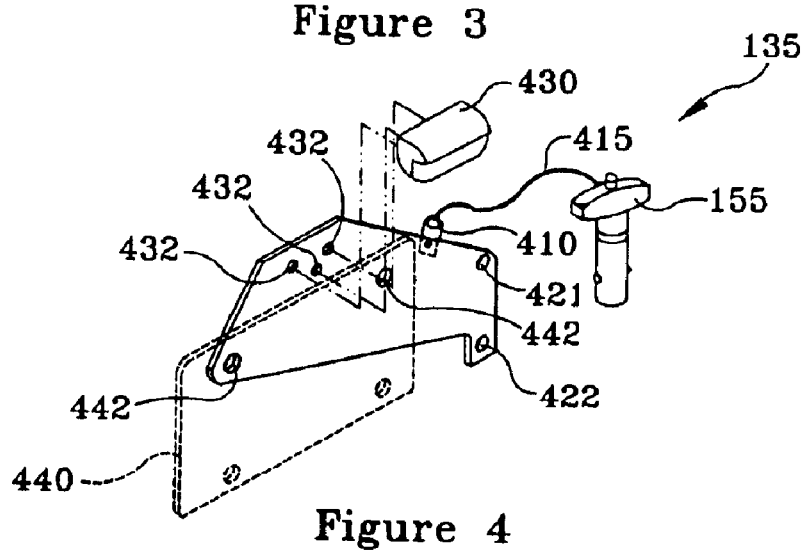
FIG. 4 is a perspective view of a license plate bracket for a tire carrier assembly in accordance with a preferred exemplary embodiment of the present invention.

Referring now to FIG. 4, an optional license plate bracket 135 in accordance with a preferred embodiment of the present invention includes a T-pin 155 coupled to clip 410 of license plate bracket 135 by a lanyard 415. Alternatively, T-pin 155 may be directly coupled to license plate bracket 135 without using a clip 410. Lanyard 415 is long enough to allow T-pin 155 to be inserted into latch bracket 120 and prevents T-pin 155 from being inadvertently lost or misplaced. Lanyard 415 may be fabricated from many different materials but is most preferably flexible and resilient in nature. License plate bracket 135 is most preferably configured to receive and support a standard-sized vehicle license plate 440. Apertures 421 and 422 are each configured to receive a mounting bolt 121 (not shown this FIG.), thereby securing license plate bracket 135 to a vehicle (not shown this FIG.). As previously mentioned, T-pin 155 is configured to be removably inserted into a pair of apertures in latch bracket 120 (not shown this FIG.), thereby securing swing arm assembly 130 in place.

T-Pin 155 is configured with an internal spring-loaded mechanism that securely holds T-pin 155 in place when inserted into latch bracket 120. When button 156 is depressed, latching portions 157 are retracted into the body of T-pin 155, thereby allowing T-pin 155 to be inserted into or removed from latch bracket 120. When T-pin 155 is inserted into latch bracket 120 and button 156 is released, latching portions 157 extend outwardly from the body of T-pin 155, thereby securing T-pin 155 in place within latch bracket 120. This prevents T-pin 155 from being jarred loose during the movement of the vehicle.

In the various preferred embodiments of the present invention, a light 430 is coupled to license plate bracket 135. Light 430 is configured and located so as to provide illumination for license plate 440. Light 430 may be any type of illumination device suitable for providing the desired level of illumination. In the most preferred embodiments of the present invention, light 430 utilizes a standard automotive light bulb, similar to those used in conventional applications for illuminating a vehicle license plate. Light 430 may be powered by any conventional means known to those skilled in the art including batteries and/or standard electrical wiring. By providing license plate bracket 135, license plate 440 may be relocated, if necessary, to a location where license plate 440 will not be obscured by tire carrier assembly 100. While the most preferred embodiments of the present invention comprise a license plate bracket 135, other embodiments will not include a license plate bracket 135.

Figure 5:
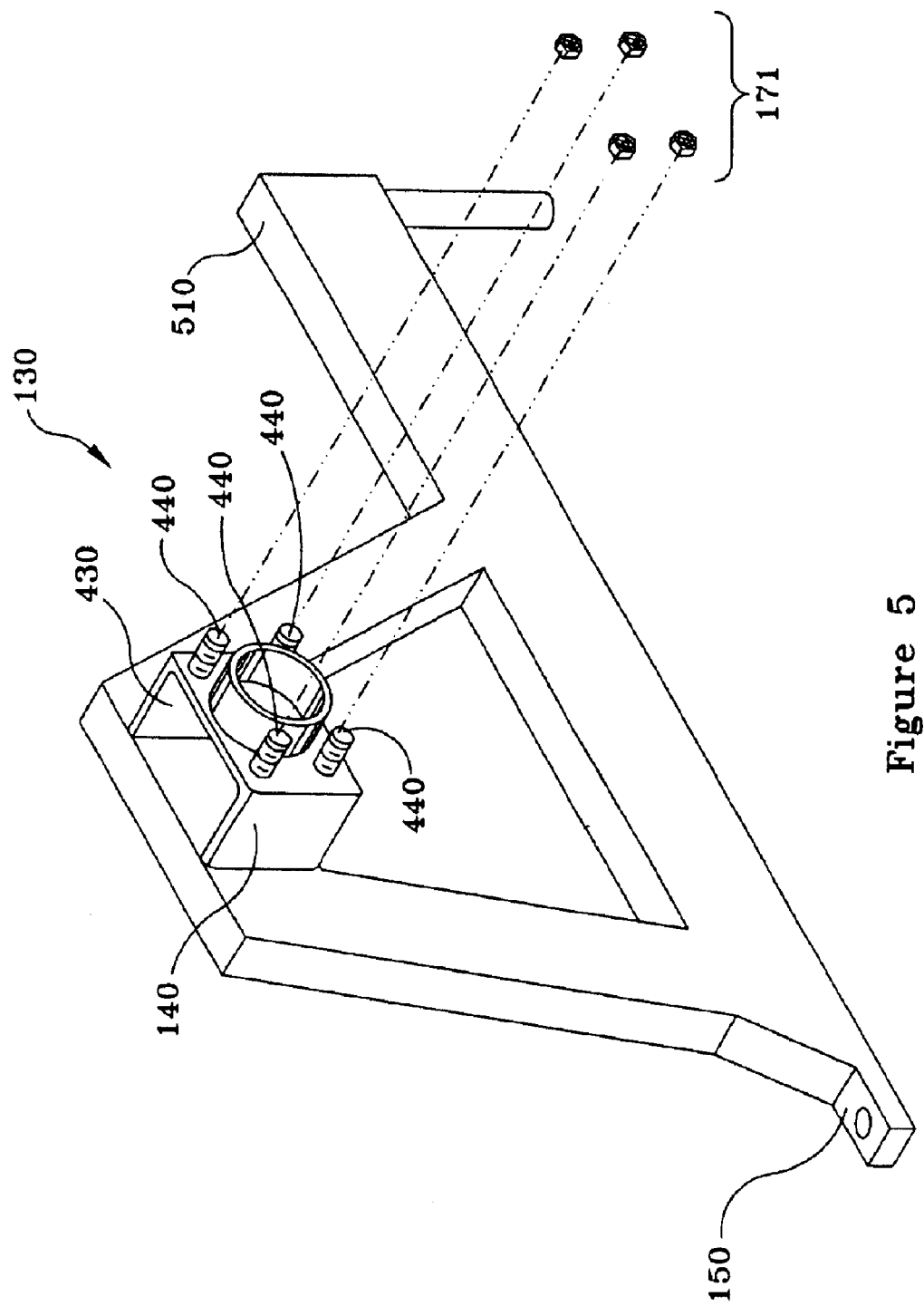
FIG. 5 is a perspective view of a swing arm assembly for a tire carrier assembly in accordance with a preferred embodiment of the present invention.

Referring now to FIG. 5, a swing arm assembly 130 in accordance with a preferred exemplary embodiment of the present invention includes a tire-mounting portion 140. Mounting portion 140 comprises a mounting plate 430 with a plurality of mounting bolts 440. Mounting portion 140 also includes a plurality of threaded mounting nuts 171. Mounting bolts 440 are most preferably threaded bolts securely coupled to mounting plate 430 and are used to couple the wheel of the spare tire to mounting plate 430. Mounting bolts 440 may be welded to mounting plate 430 or affixed using ally other suitable attachment method known to those skilled in the art. In an alternative preferred exemplary embodiment of the present invention, mounting bolts 440 are an integral part of mounting plate 430 and are formed from a unitary piece of hardened steel. Mounting nuts 171 are most preferably internally threaded nuts and are removably fastened to mounting bolts 440, thereby securing a spare tire wheel (not shown this FIG.) to mounting plate 430. In an alternative embodiment of the present invention, mounting bolts 440 are not threaded and mounting nuts 171 are held in place by selectively releasable compression or spring-loaded fittings.

In the most preferred embodiments of the present invention, mounting bolts 440 and threaded mounting nuts 171 are sized and threaded to match the standard lug bolts and lug nuts for a typical vehicle. This makes it possible to interchange the regular lug nuts and mounting nuts 171. Additionally, any necessary replacement of lost or missing threaded mounting nuts 171 will be simpler. This feature also allows the same lug wrench to be used to remove the regular lug nuts and threaded mounting nuts 171.

When swing arm assembly 130 is coupled to latch bracket 120 with selectively removable T-pin 155, swing arm assembly 130 is fixed in position. When T-pin 155 is removed from latch bracket 120, swing arm assembly 130 is free to pivot in a substantially horizontal fashion, with hinge bracket 110 acting as a hinge or pivot point. In this manner, swing arm assembly 130 can swing away from the vehicle and access to the rear door of the vehicle is thereby provided. In the most preferred embodiments of the present invention, latch bracket 120 and 150 comprise a latch mechanism for allowing for the displacement of swing arm assembly 130 between a closed position whereby swing arm assembly 130 is adjacent to a rear door and an open position whereby swing arm assembly 130 extends laterally away from the vehicle.

From the foregoing description, it should be appreciated that apparatus and methods for a mounted tire carrier assembly are provided and presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

What is claimed is:

1. A tire carrier assembly for mounting a tire to a vehicle comprising:

a hinge bracket mounted beneath a first manufacturer-supplied D-ring;

a latch bracket mounted beneath a second manufacturer-supplied D-ring;

a swing arm assembly configured to be pivotably mounted to said hinge bracket and selectively coupled to said latch bracket: and a license plate bracket configured to be mounted beneath said latch bracket and said second D-ring.

2. The tire carrier assembly of claim 1 wherein said license plate bracket further comprises a light, said light being configured to illuminate a license plate.

3. The tire carrier assembly of claim 1 further comprising:

a T-pin;

a lanyard coupled between said T-pin and said license plate bracket, said T-pin being selectively insertable into said latch bracket, thereby securing said swing arm assembly in place.

4. The tire carrier assembly of claim 1 wherein said hinge bracket further comprises a grease plug, said grease plug being configured to receive a lubricating material.

5. The tire carrier assembly of claim 1 wherein said hinge bracket further comprises a selectively removable freeze plug.

6. The tire carrier assembly of claim 1 wherein said hinge bracket further comprises a bronze insert.

7. The tire carrier assembly of claim 1 wherein said hinge bracket further comprises:
   a bronze insert;
   a selectively removable freeze plug; and
   a grease plug, said grease plug being configured to receive a lubricating material.

8. The spare tire assembly of claim 1, wherein said swing arm and said latch bracket comprise a latch mechanism, allowing for the displacement of said swing arm between a closed position whereby said swing arm is adjacent to a rear door and an open position whereby said swing arm extends laterally away from said vehicle.

9. The tire carrier assembly of claim 1, wherein said swing arm assembly further comprises:
   a pin portion, said pin portion being removably inserted into said hinge bracket; and
   a mounting portion, said mounting portion being configured to receive said tire.

10. The tire carrier assembly of claim 9 wherein said mounting portion comprises:
    a mounting plate;
    a plurality of mounting bolts coupled to said mounting plate; and
    a plurality of mounting nuts wherein one of said plurality of mounting nuts is removably fastened to each of said plurality of mounting bolts, thereby securing said tire to said mounting plate.

11. A tire carrier assembly for mounting a tire to a vehicle comprising:
    a hinge bracket configured to be mounted beneath a first D-ring, said hinge bracket comprising:
      a bronze insert;
      a selectively removable freeze plug; and
      a grease plug, said grease plug being configured to receive a lubricating material;
    a latch bracket configured to be mounted beneath a second D-ring;
    a license plate bracket configured to be mounted beneath said latch bracket and said second D-ring;
    a light coupled to said license plate bracket, said light being configured to illuminate a license plate;
    a swing arm assembly configured to be pivotably mounted to said hinge bracket and selectively coupled to said latch bracket;
    a T-pin configured to be selectively inserted into said latch bracket, thereby coupling said swing arm assembly to said latch bracket and securing said swing arm assembly in place;
    a lanyard positioned between and coupled to said T-pin and said license plate bracket, said lanyard coupling said T-pin to said license plate bracket.

12. The tire carrier assembly of claim 11, wherein said swing and assembly further comprises:
    a pin portion, said pin portion being removably inserted into said hinge bracket; and
    a mounting portion, said mounting portion being configured to receive said tire.

13. The tire carrier assembly of claim 12 wherein said mounting portion comprises:
    a mounting plate;
    a plurality of mounting bolts coupled to said mounting plate; and
    a plurality of mounting nuts wherein one of said plurality of mounting nuts is removably fastened to each of said plurality of mounting bolts, thereby securing said tire to said mounting plate.

14. A method of mounting a tire carrier assembly to a vehicle, said vehicle comprising a first and a second D-ring, wherein each of said first and second D-rings is coupled to said vehicle with a plurality of mounting bolts, said plurality of mounting bolts being inserted through a plurality of apertures in said first and second D-rings and into a plurality of vehicle mounting apertures, the method comprising the steps of:
    (a) removing said plurality of mounting bolts from said vehicle mounting apertures, thereby removing said first D-ring and said second D-ring from said vehicle;
    (b) positioning a hinge bracket between said vehicle and said first D-ring;
    (c) aligning a plurality of apertures in said hinge bracket with a plurality of apertures in said first D-ring;
    (d) inserting a plurality of mounting bolts through said plurality of apertures in said hinge bracket and said plurality of apertures in said first D-ring, and into said mounting apertures in said vehicle mounting apertures, thereby mounting said hinge bracket and said first D-ring to said vehicle;
    (e) positioning a latch bracket between said vehicle and said second D-ring;
    (f) aligning a plurality of apertures in said latch bracket with a plurality of apertures in said second D-ring;
    (g) inserting a plurality of mounting bolts through said plurality of apertures in said latch bracket and said plurality of apertures in said second D-ring, and into said vehicle mounting apertures, thereby mounting said latch bracket and said second D-ring to said vehicle;
    (h) inserting a swing arm assembly into said hinge bracket.

15. The method of claim 14 wherein steps (e), (f), and (g) are accomplished prior to steps (b), (c), and (d).

16. The method of claim 14 further comprising the step of selectively inserting a T-pin through an aperture in said swing arm assembly and an aperture in said latch bracket, thereby securing said swing arm assembly to said latch bracket.

17. The method of claim 14 further comprising the step of positioning a license plate bracket between said latch bracket and said vehicle prior to mounting said latch bracket to said vehicle.

18. The method of claim 17 further comprising the steps of:
    coupling a light to said license plate bracket; and
    configuring said light to illuminate a license plate.

* * * * *